United States Patent [19]

Belmares-Sarabia et al.

[11] Patent Number: 4,694,329
[45] Date of Patent: Sep. 15, 1987

[54] COLOR CORRECTION SYSTEM AND METHOD WITH SCENE-CHANGE DETECTION

[75] Inventors: Armand Belmares-Sarabia, Deer Park, N.Y.; Stanley J. Chayka, Parsippany, N.J.

[73] Assignee: Corporate Communications Consultants, Inc., Fairfield, N.J.

[21] Appl. No.: 722,801

[22] Filed: Apr. 12, 1985

Related U.S. Application Data

[63] Continuation-in-part of Ser. No. 598,468, Apr. 9, 1984.

[51] Int. Cl.$^4$ .......................... H04N 9/64; H04N 9/11
[52] U.S. Cl. ........................................ 358/22; 358/80; 358/105; 358/183; 358/29
[58] Field of Search ..................... 358/22, 29, 105, 183

[56] References Cited

U.S. PATENT DOCUMENTS

| | | | |
|---|---|---|---|
| 3,603,729 | 9/1971 | Sperber | 358/105 |
| 3,772,465 | 11/1973 | Vlahos et al. | 358/22 |
| 3,780,223 | 12/1973 | Perry | 358/183 |
| 4,035,835 | 7/1977 | Poetsch | 358/29 |
| 4,096,523 | 6/1978 | Belmares-Sarabia et al. | 358/80 |
| 4,194,839 | 3/1980 | Knop | 356/407 |
| 4,223,343 | 9/1980 | Belmares-Sarabia et al. | 358/54 |
| 4,274,107 | 6/1981 | Tamura et al. | 358/29 |
| 4,307,962 | 12/1981 | Jung | 356/405 |
| 4,410,908 | 10/1983 | Belmares-Sarabia et al. | 358/30 |
| 4,475,124 | 10/1984 | Ankeny et al. | 358/183 |
| 4,525,736 | 6/1985 | Korman | 358/28 |

FOREIGN PATENT DOCUMENTS

| | | |
|---|---|---|
| 0056848 | 8/1982 | European Pat. Off. . |
| 0140071 | 5/1985 | European Pat. Off. . |
| 50795 | 4/1980 | Japan ..................... 358/29 |
| 2041691 | 9/1980 | United Kingdom . |
| 2121645 | 12/1983 | United Kingdom . |

OTHER PUBLICATIONS

D. E. Pearson, T. J. Dennis, "A Simple Motion Detector for Television Signals", Journal of the SMPTE, vol. 82, pp. 17–21, Jan. 1973.
"The Pre-Programming of Film-Scanner Controls," E.B.U. Review–Technical Part, No. 134, Aug. 1972, pp. 156–162, by Kitson et al.
"Preprogrammed and Automatic Color Correction for Telecine," Journal of the SMPTE, vol. 83, No. 8, Aug. 1974, pp. 633–639, by Kitson et al.
RCA Technical Manual entitled "Type TK-28 Color Film Camera Systems".

Primary Examiner—John W. Shepperd
Attorney, Agent, or Firm—Curtis, Morris & Safford

[57] ABSTRACT

In a scene-by-scene color corrector, automatic color correction circuitry produces color correction signals which are stored and utilized in preparing color-corrected video tape. Preferably, the automatic correction circuit tests only a pre-selected portion of the video picture displayed on a monitor. This portion or "window" is visible on the monitor screen, and its position and size can be changed as desired. The use of the "window" permits the exclusion of portions of the picture on which the automatic circuitry is less than fully effective, or which do not have components desirable for use in automatic color correction. If a separately variable luminance signal is produced, the automatic color correction circuitry preferably uses the luminance signal as a reference, thus allowing one to maintain color balance despite changes in the luminance signal. A scene-change analyzer determines whether the average window signal level in at least a portion of one field is different from the average window signal level in at least a portion of another field by a predetermined amount, and if so, it provides a suitable output signal. A scene-change analyzer may be used in a color corrector for scene-by-scene corrections. The film or tape transport may be stopped after a scene-change signal is produced, and the color correction values may be adjusted while the film or tape is stopped. Alternatively, the transport may continue to move the film or tape after a scene-change signal is produced, and the color correction values may be adjusted while the film or tape is moving.

8 Claims, 12 Drawing Figures

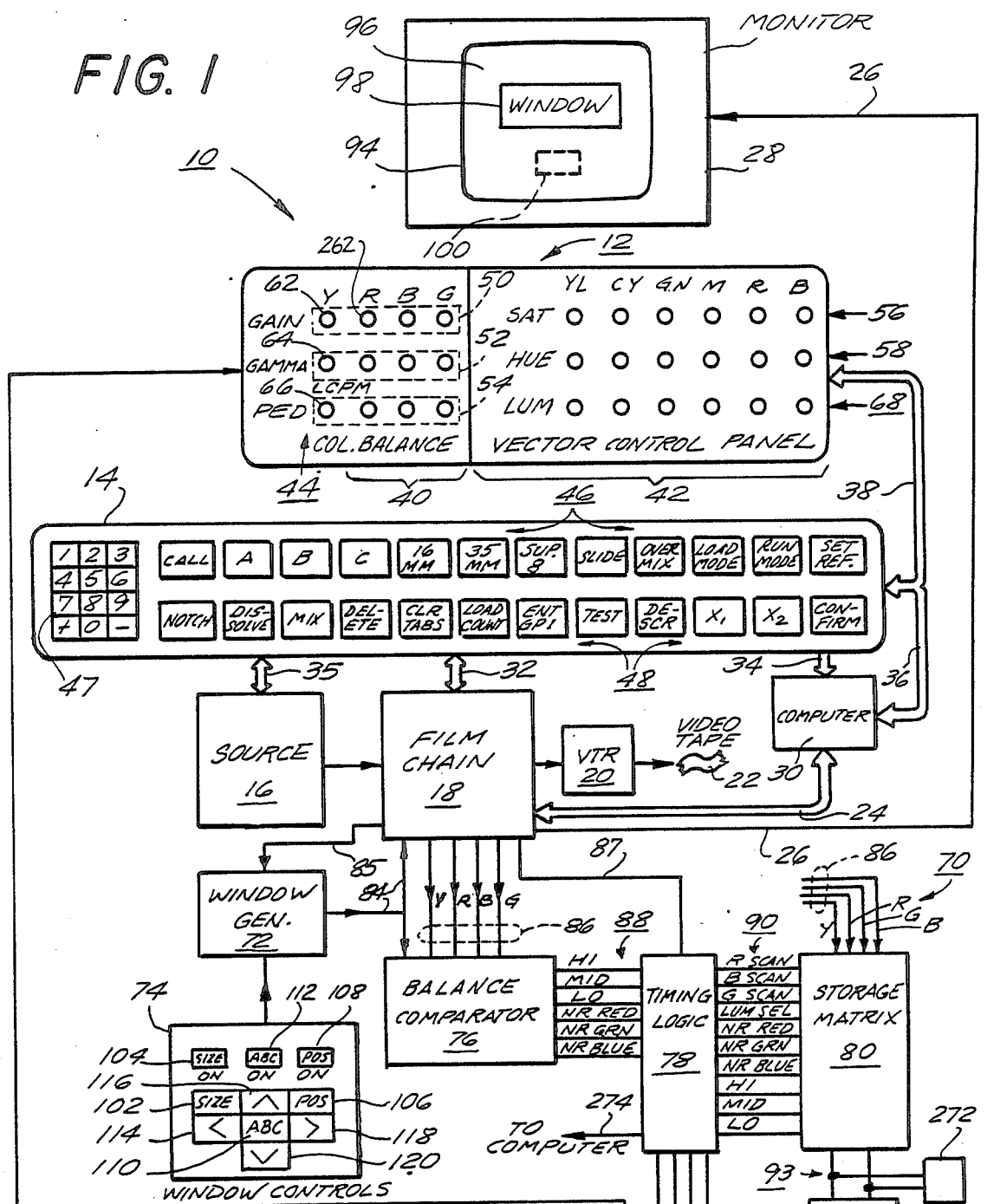
FIG. 1
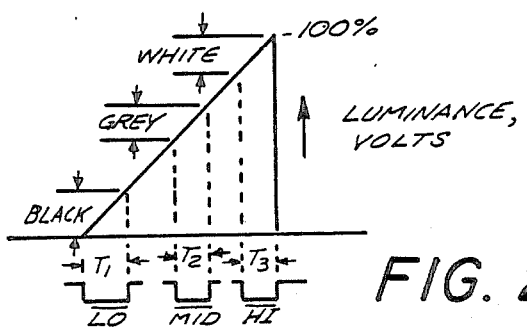
FIG. 2
FIG. 8

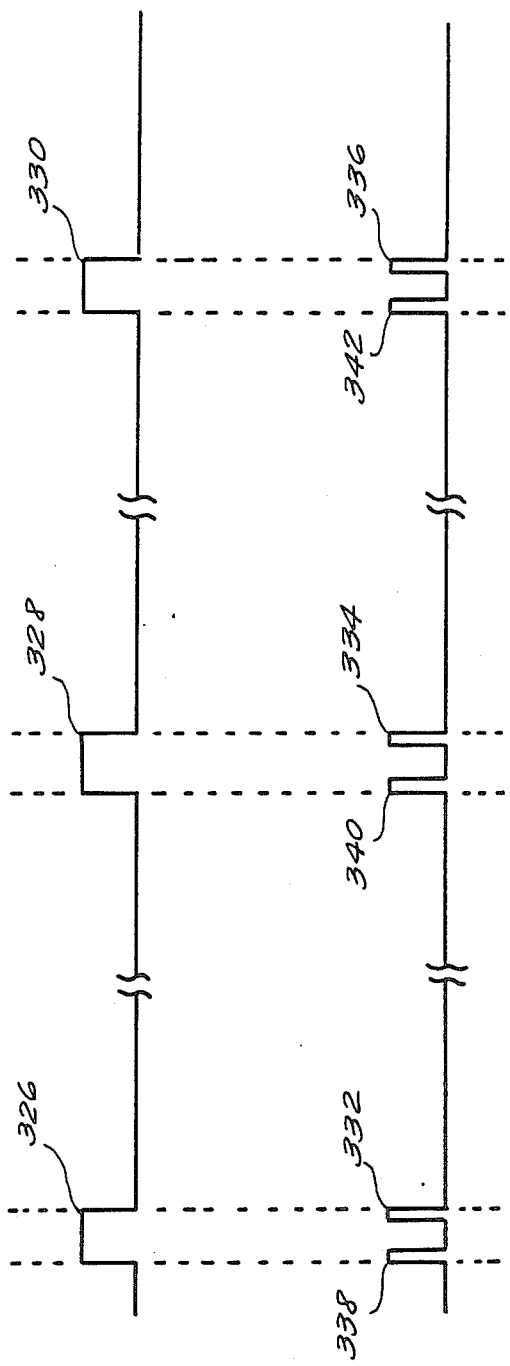

COLOR CORRECTION SYSTEM AND METHOD WITH SCENE-CHANGE DETECTION

This application is a continuation-in-part of application Ser. No. 598,468, filed on Apr. 9, 1984.

This invention relates to the color correction of video signals, and particularly to the automatic color correction of such signals. This patent describes improvements upon the color correction systems and methods described in the "Rainbow" U.S. Pat. No. 4,096,523, the "Luminance" U.S. Pat. No. 4,410,908, and the "Anamorphic" U.S. Pat. No. 4,223,343 whose disclosures hereby are incorporated herein by reference.

There is a continuing need to improve the efficiency, speed and accuracy of color correction of video signals, especially in film-to-tape or tape-to-tape transfers, and particularly in scene-by-scene color correction. It is an object of the invention to provide such improvement.

There also is a need for improvement in the means available for segregating specific areas of video pictures for analysis and examination. It is a further object of the invention to provide such improvement.

There also is a continuing need for improvement in automatic color correctors, especially in automatic color balancing circuits. It is desired to increase their effectiveness, despite the presence of pastel (low "chroma") colors which normally make most such circuits useless. The inventors also have recognized a need to improve the effectiveness of such circuits in equipment in which the luminance signal can be varied separately.

Scene-change detectors for use with color correctors are described in an article entitled "The Pre-Programming of Film-Scanner Controls," by D. J. M. Kitson, A. B. Palmer, R. H. Spencer, J. R. Sanders, and M. Weston, which was published in *E.B.U. Review*, No. 134, August 1972, on pages 156–162, and an article entitled "Preprogrammed and Automatic Color Correction for Telecine," by D. J. M. Kitson, J. R. Sanders, R. H. Spencer and D. T. Wright, which was published in the *Journal of the SMPTE*, Volume 83, August 1974, on pages 633–639. There is, however, need for improvement of scene-change detectors, and it is an additional object of the invention to provide such improvement.

In accordance with one aspect of the present invention, an automatic color corrector is used to develop color correction signals for storage and later use in scene-by-scene color correction. This greatly speeds the color correction process. Preferably, the automatic corrector automatically balances the three primary colors, red, blue and green with respect to one another.

In another aspect of the invention, the portion of the video picture which is tested during color correction is limited to a preselected area or "window" which is less than the area of the full picture. This allows the color corrector to concentrate upon a specific portion of the picture which has a specific color or monochrome content.

Preferably this arrangement is used with an automatic color corrector which samples only the video signals within the preselected area. Then, the corrections so derived are stored and utilized when the corrected signals are recorded on video tape, or the corrections are used immediately during broadcasts.

The speed of color correction is improved by the use of an automatic color corrector. The use of the window greatly improves the effectiveness and accuracy of the automatic corrector. For example, the window can be used to prevent the sampling of large pastel colored areas such as light blue sky, pastel walls, etc., the sampling of which often makes prior automatic color balancing circuits useless.

The selected area or "window" preferably is highlighted by darkening the picture around the window. Alternatively, the window may be outlined by bright lines. Also, the window can be moved to essentially any part of the video picture, and can be changed in size. Its size can be made very small so that it samples a small area of the picture which is black or gray or white, or has a specific color or monochrome characteristic to be sampled, or it can be made very large, if that suits the purpose at hand.

When used in a scene-by-scene color corrector, the combination of the window and an automatic color balancing circuit can be used to greatly speed the initial color balancing of each scene. If the balance achieved for one scene is suitable for use in others, it can be stored and reutilized, with or without modifications, thus further speeding the color correction process.

In a color corrector which produces separate luminance signals and provides for the separate variation of the characteristics of such signals, the automatic color balancing circuit balances the red, green and blue video signals with respect to the luminance signal. This allows the luminance signal to be changed without greatly impairing the chrominance-to-luminance ratio. This defect would create colors with a poor appearance due to wrong color intensity. Since the luminance signal is used as reference, the other signals will change appropriately when the luminance signal is changed.

An additional aspect of the invention concerns a specific scene-change analyzer. The scene-change analyzer compares the average level of a video signal in at least a portion of one field with the average level of the video signal in at least a portion of another field. If the comparison indicates that a scene change has occurred, a suitable signal is provided at the output of the scene-change analyzer. The scene-change analyzer may process, with the aid of a computer, the average levels of the video signal in a series of fields in order to determine what type of transition, e.g., abrupt or gradual, has taken place.

The foregoing and other objects and advantages of the invention will be described and are apparent from the following description and drawings.

In the drawings:

FIG. 1 is a schematic circuit diagram of a color correction system constructed in accordance with the present invention;

FIG. 2 is an electrical waveform diagram utilized in explaining some of the principles of the present invention;

FIG. 8 is a perspective view of an alternative component utilized in accordance with the present invention;

FIGS. 10 and 11 are waveform diagrams illustrating waveforms from the circuit depicted in FIG. 9.

GENERAL DESCRIPTION

Figure 3:
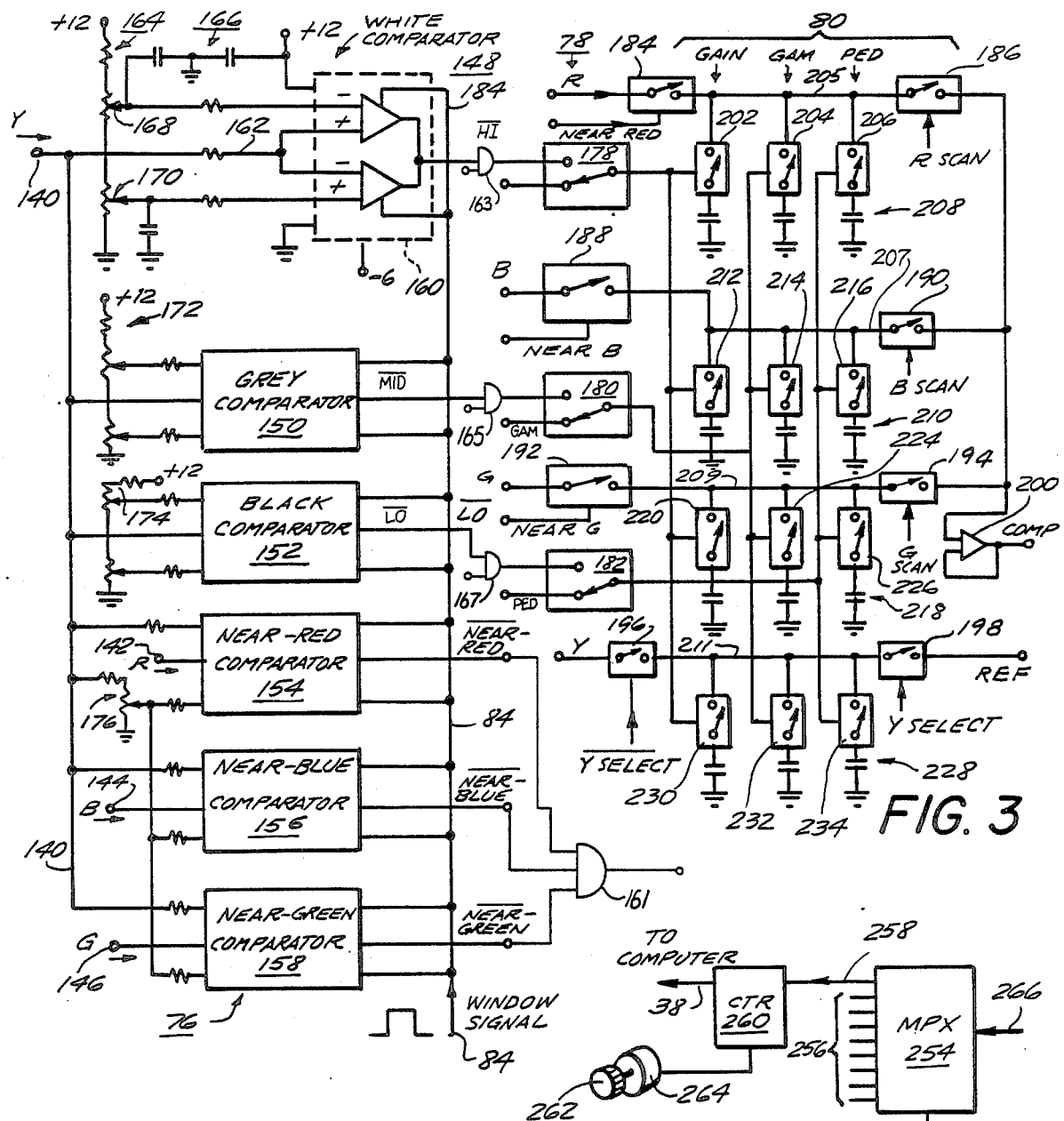
FIG. 3 is an electrical schematic circuit diagram of a portion of the color correction system of the invention.

The color correcting system 10 shown in FIG. 1 includes a motion picture projector or other source 16 which delivers color motion picture images to a film chain 18 which converts the visible images into video signals. Control units 12 and 14 are provided, together with a computer 30 and interconnecting cables 24, 26, 32, 34, 35, 36 and 38, to control the color correction of the video signals. The color-corrected video signals then are delivered to a video tape recorder 20 which produces a color-corrected video tape record 22 of the program.

It should be understood that the invention is not limited to the use of a film chain as a source of video picture signals. The source 16 also can be a video tape player, a film scanner of any type, or a video camera, or any other means for developing or storing color video signals. As another alternative, the output of the system can be delivered directly to a transmitter for broadcasting rather than to a video information storage device.

The full details of the system 10 have not been set forth in this description since they are described sufficiently in the patents mentioned above. Reference should be made to those patents for further details.

CONTROL PANELS

The control panel 12 includes a group 40 of color balance controls, hue and saturation controls 56 and 58, and two groups 44 and 68 of luminance controls. The color balance, hue and saturation controls are substantially the same as the corresponding controls described in the "Rainbow" and "Luminance" patents identified above. A row of four control knobs 50 is provided for adjusting and correcting the gain of "R", "B", "G" and "Y" (red, blue, green and luminance) signals in the film chain. Similarly, a row 52 of four knobs is provided to correct the gamma of those signals, and a third row 54 of four knobs is provided to correct the pedestal factor of those signals.

Three rows 56, 58 and 68, consisting of six control knobs each, are provided, one for adjusting the saturation, one for adjusting the hue and one for adjusting the luminance of the six color derivative signals, yellow, cyan, green, magenta, red and blue.

The luminance controls 44 and 68 are the same as those bearing the same reference numerals in the "Luminance" patent U.S. Pat. No. 4,410,908 mentioned above. The luminance gain control 62 is the same as the "Density" control; the luminance gamma control 64 is the same as the "LCPM" control; and the luminance pedestal control 66 has the same name and function as in the latter patent.

In accordance with the present invention, there is provided an automatic balance circuit 70, a "window" generator 72, and a window control panel and unit 74.

The automatic balance circuit includes a balance comparator circuit 76 which is connected by lines 86 to receive the red, blue, green and luminance signals from the film chain 18.

The balance comparator circuit 76 delivers signals over output lines 88 to a timing logic circuit 78 which receives sync and other timing signals from the film chain 18 and the computer 30 over lines 87 and controls the operation of a storage matrix circuit 80 and an A/D convertor 82. Signals are sent from the timing logic circuit 78 over lines 90 to the storage matrix 80, and the storage matrix 80 delivers signals over lines 93 to the A/D converter 82 whose operation is controlled, in part, by scan address signals delivered over lines 92.

The output of A/D convertor 82 is sent over an output line 193 to the output circuits for the color balance controls 40, where the color correction signals developed by the circuit 70 are combined with the potentiometer settings to color correct the images which appear on the video screen 94 of the monitor 28 at the top of FIG. 1.

The window generator 72 generates signals which create a "window" 98 in the picture on the screen of the monitor 28. This window preferably is visible; it is highlighted by attenuating the video signals in the portion 96 of the screen outside of the window, while leaving the signals within the window area at full brightness so that the portions of the picture within the window appear much brighter than those surrounding it. Since the window is located in the main monitor 28 rather than in some auxiliary monitor, the operator need not look anywhere else to see the window. This is another feature enhancing efficiency and speed of operation.

The signals necessary to create the window are delivered to the film chain 18 and the balance comparator 76 over lines 84. The window signal delivered to the comparator 76 disables the automatic balancing circuit 70 during receipt of the video signals forming the picture elements outside of the window, so that the automatic balancing circuit samples only the signals within the window.

Both the size and the position of the window 98 can be varied by means of the window control unit 74. For example, a smaller window 100 is shown in dashed outline in FIG. 1. It not only has been made smaller, but it has been moved downwardly from the window 98. The area covered by the window can vary anywhere from the full size of the screen 94, down to a very small area.

The use of the window in color correction is highly advantageous. It allows one to limit the area of the picture sampled by automatic balance circuitry, or in manual color correction.

One of the problems solved by the use of the window include the one wherein most prior automatic balance circuits will erroneously detect a pale blue sky or a large pastel wall area as an area of the picture containing color errors needing correction. Thus, the circuitry would erroneously change the light pastel colors to white. By use of the movable window, the large pastel areas or the blue sky can be avoided in sampling, thus preventing some of the most significant errors of the prior art.

The window also can be used to sample only very small areas of the picture, such as those where there are pure blacks, whites or grays, in order to automatically set up black, white and gray correction signals. If desired, these correction signals then can be stored and used as reference correction signals for various other scenes in a piece of film or tape being converted to a color-corrected video tape recording.

WINDOW CONTROLS

The window controls shown in FIG. 1 include a "Size" pushbutton 102, a "Position" pushbutton 106, and an automatic balance circuit start pushbutton (marked "ABC") 110. Depression of any of those buttons causes the window 98 to appear on the screen. Indicator lamps 104, 108 and 112 are provided to light up and thereby indicate when the "Size" or the "Position" or the "ABC" pushbutton has been enabled.

Also provided are multiple-function cursor buttons 114, 116, 118, and 120. When the position button 106 is pushed to enter the position changing mode of operation, each of the four cursor buttons can be operated to move the entire window in the direction indicated by the arrow marked on the face of the cursor pushbutton.

When the "Size" pushbutton is used to enable the size mode of operation, the button 118 can be pushed to make the window larger in the horizontal direction, and the button 114 can be pushed to make it smaller in the horizontal direction. Similarly, the pushbutton 116 can be pushed to make the window larger vertically, and the button 120 can be pushed to make the window smaller vertically.

Figure 5:
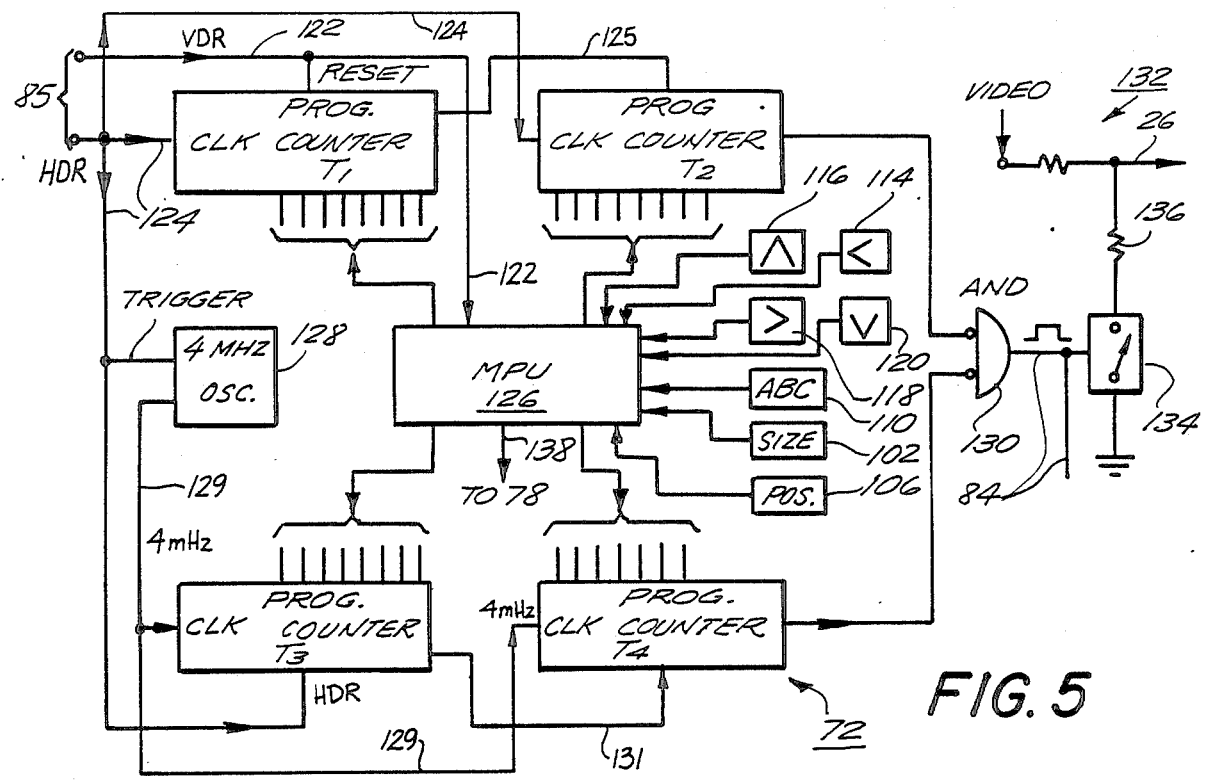
FIG. 5 is a schematic circuit diagram of another portion of the system of the invention.

The circuitry used to carry out this operation is shown schematically in FIG. 5. The horizontal and vertical drive signals are delivered from the film chain 18, telecine, VTR, or other video signal source over a cable 85 (FIG. 1) as inputs to the window generator circuit shown in FIG. 5.

The vertical drive signal is supplied over a line 122 to the "pre-load" or gate terminal of a programmable digital counter T1. The horizontal drive signal is supplied over a line 124 to the clock terminals of the counters T1 and T2 and the output of the first counter T1 is supplied over a line 125 to the "pre-load" or gate terminal of counter T2.

The horizontal drive signal also is supplied on line 124 to the pre-load line of the programmable counter T3.

The counters actually used are #8253 Programmable Interval Timers sold by Intel Corporation. They count down to zero from the pre-set count, and turn on upon receipt of a positive going signal on the gate line.

A four megahertz oscillator 128 is triggered by the horizontal drive pulses on line 124 and supplies clock pulses over the line 129 to the clock inputs of the counters T3 and T4 in synchronism with the horizontal drive pulses. The output of the counter T3 is supplied over the line 131 to the "pre-load" or gate input of the counter T4.

The outputs of counters of T2 and T4 are supplied as inputs to AND gate 130 which supplies an output pulse to turn on a FET switch 134 which forms part of an attenuation network 132.

The window generator circuit 72 operates to create a signal which closes the switch 134, thus connecting all video signals to ground through an attenuating resistor 136, for all signals outside of the window. This causes those areas of the picture outside of the window to darken, thus highlighting the picture portions within the window.

The output of the AND gate 130 also is supplied over line 84 to the film chain 18 and the balance comparator 76 (see FIG. 1). The video signal, whether attenuated or unattenuated is delivered over line 26 to the monitor 28.

A microprocessor 126 is provided to supply variable program information to the four programmable counters T1, T2, T3 and T4. It receives as inputs signals from the four cursor pushbuttons, and the ABC, Size and Position pushbuttons. The microprocessor 126 also receives vertical drive signals, which are supplied on the line 122. The microprocessor 126 samples the signals in the window for a predetermined number of vertical drive signals during operation of the automatic balance circuit, as described in greater detail below.

Figure 6:
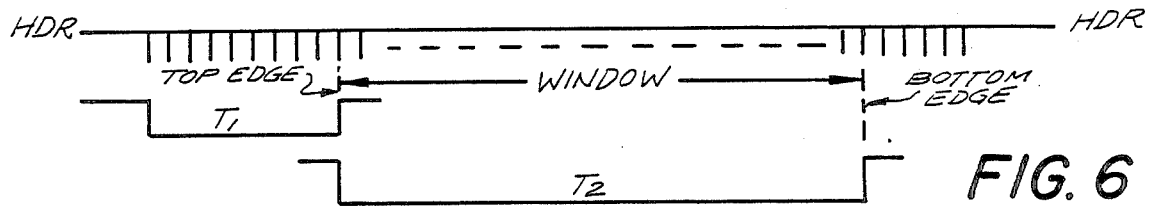
FIGS. 6 and 7 are waveform diagrams explaining additional features of the present invention.

The waveforms of the signals used in controlling the positions of the top and bottom edge of the window are shown in FIG. 6. The vertical drive signal ("VDR") is shown at the top of FIG. 6. The horizontal drive signal ("HDR") is shown in the middle of FIG. 6. Each horizontal drive signal is shown as a negative spike, a waveform which is achieved by known means. Only a portion of the pulses of the horizontal drive signal for one full line is shown in FIG. 6.

In the bottom portion of FIG. 6 are shown waveforms of the outputs of the counters of T1 and T2.

The output of counter T1 goes negative in response to receipt of the vertical drive pulse. When it has counted down to zero from the count programmed into it, the output of T1 goes positive, thus starting counter T2. Counter T2 then counts a predetermined number of horizontal drive pulses, thus in effect counting that number of horizontal lines of the picture, and then goes positive again, ending the counting sequence. The "AND" gate 130 is of the type requiring two negative signals on its inputs before it will produce an output. One of those negative signals is supplied by counter T2 during the interval marked "WINDOW" in FIG. 6.

Figure 7:
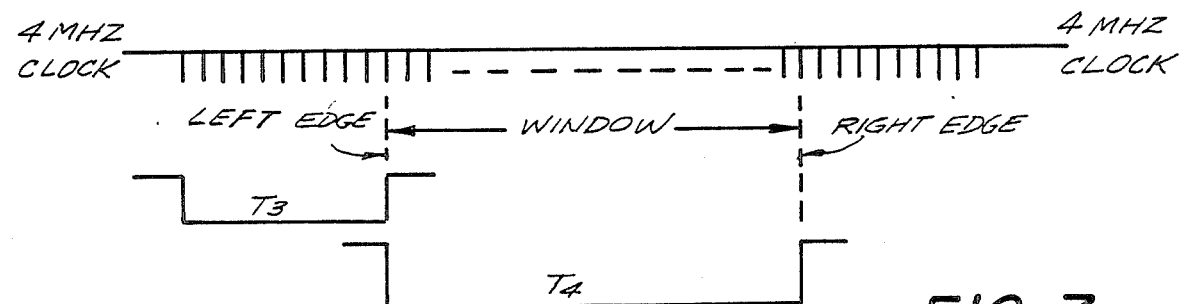

The waveforms illustrating the operation of counters T3 and T4 are shown in FIG. 7. The horizontal drive signal "HDR" of FIG. 6 is shown on a greatly enlargd time scale in FIG. 7 so that only a little over one cycle of the horizontal drive signal is shown. During that time period, a predetermined number of clock pulses is delivered from the oscillator 128. Only some of the pulses are shown in FIG. 7.

When the horizontal drive signal is detected, the output of T3 goes negative, and then again goes positive after it has counted a predetermined number of pulses. When the output of T3 goes positive, T4 starts and counts a predetermined number of clock pulses and then goes positive. The output of T4, when it is negative, thus defines the width of the window.

The positive output pulse on line 84 at the output of AND gate 130 in FIG. 5 is produced only when signals T2 and T4 are negative, that is, during the portion marked "WINDOW" in FIGS. 6 and 7.

Through conventional programming, the microprocessor 126 causes the window to change size and position by changing the programming of the counters T1, T2, T3 and T4. When the Position pushbutton 106 is pushed, it stays on until pushed again to release it. During operation with the Position button pushed, depression of the cursor 116 causes a reprogramming of counter T1 so that its output goes positive at a lower count, thus moving the entire window upwardly. Similarly, operation of the cursor 120 increases the starting count of T1 and moves the window downwardly.

Similarly, depression of the cursor 118 during this mode of operation causes the output change of T3 to occur at a higher count, thus moving the entire window to the right. Depression of the cursor 114 causes the starting count of T3 to decrease, thus moving the window to the left.

In each case, the amount of movement of the window is proportional to the length of time that the cursor is held in, and movement stops when the cursor is released and the pushbutton springs back outwardly.

When operated in the Size mode by depression of the Size enabling button 102, the programming of the counters is changed in the following manner. The size of the window is changed symmetrically with respect to the center of the window; that is, when a dimension of the window changes, it changes by the same amount on both sides of a central axis. Thus, when the width of the window is enlarged, the starting count of the counter T3 is reduced, while that of counter T4 is increased, with the amount of decrease in T3 being one-half of the increase in T4. When the width is reduced, the opposite operation takes place; that is, the count of T3 increases and that of T4 decreases, the decrease in T4 being twice the decrease in T3.

Similarly, in changing the height of the window, the count of T1 is varied in a sense opposite to the direction of change of the count of T2, with the count of T2 increasing or decreasing at twice the rate of the count of T1.

In the foregoing manner, the window size can be adjusted smoothly and symmetrically with respect to the center of the window.

AUTOMATIC BALANCE CIRCUIT

Referring again to FIG. 5, the microprocessor 126 is programmed so that when the ABC button 110 is pressed, the equipment automatically samples the signals within the window for ninety cycles of the vertical drive signal; that is, for ninety consecutive fields of the video picture. This sampling process takes approxiamtely 1½ seconds. At the end of this sequence, the automatic color correction will have been completed, and the window signal is cancelled so that the picture is displayed without the window on the screen 94 of the monitor 28. The window will not reappear until one of the Size or Position buttons 102 or 106 is depressed.

Now referring to FIG. 3, the balance comparator 76 receives the luminance signal "Y" on terminal 140, and the R, B and G, signals on terminals 142, 144 and 146, respectively. The circuit 76 includes a white comparator 148, a gray comparator 150, a black comparator 152, a near-red comparator 154, a near-blue comparator 156, and a near-green comparator 158.

The purpose of each of the white, gray, and black comparators is best understood by reference to FIG. 2. FIG. 2 is a waveform diagram of a standard luminance ramp signal in which ranges of voltage are shown for black, gray and white values. Each of the white, gray and black comparators shown in FIG. 3 has the purpose of setting the acceptable range of white, gray and black signals, as illustrated in FIG. 2, and producing an output signal whenever the luminance signal actually detected is within that predetermined range.

Referring to the upper left-hand corner of FIG. 3, the white comparator circuit 148 is shown in detail. However, the details of the other comparators are not shown, since they are identical to those of the white comparator. The comparator 148 uses a high-speed, dual-section voltage comparator integrated circuit chip 160, such as a number 711 chip sold by Fairchild. The positive and negative input terminals of the operational amplifiers within the chip are connected together and, through a line 162 and a resistor to the luminance input line 140. A range-setting network 164 is provided. The network consists of a resistor connected in series with two potentiometers 168, 170 with 12 volts D.C. applied across the combination. A bias network 166 also is provided. By the adjusting potentiometers 168 and 170, the range of voltages within which the comparators will produce an output is set. Range-setting networks 172 and 174 for the gray and black components are identical to network 164.

The signal on the output lead $\overline{\text{HI}}$ of the comparator 148 has the waveform shown in FIG. 2; that is, it is a negative-going pulse. The time duration T3 of the pulse depends upon the white voltage range setting, and the rate of change of the luminance voltage while it is within the white range. Thus, the output of each of the white, gray and black comparators, as illustrated in FIG. 2, is a pulse whose time duration varies with the rate of change of the luminance signal within its range. Of course, the time during any horizontal scan in which each of the three signals occurs depends upon the instantaneous variations of the luminance signal along the horizontal trace.

The other three comparators of the circuit 76 are designed to produce an output only if the red or blue or green signal at a given instant is within a given relatively narrow range or "tolerance" above or below a reference. As it is well known in the prior art, the outputs of the comparators are delivered to an AND gate so that no control signals are supplied to the circuit 80 unless each of the comparators 154, 156 and 158 produces the appropriate output signal. This concept is shown, for example, in FIGS. 20 and 21 of an RCA technical manual entitled "Type TK-28 Color Film Camera Systems" and described in the accompanying text. Of course, as it would be readily evident to one skilled in the art, the grey, white and black comparators should be disabled from operating until all of the comparators 154, 156 and 158 generate output signals. Specifically, the AND gates 161, 163, 165, and 167 shown in FIG. 3 are employed for this purpose. The output signals from the comparators 154, 156, and 158 are sent to the input of the AND gate 161. (The output signals from the comparators 154, 156, and 158 are also delivered to the switching circuits 184, 188, and 192, respectively, as illustrated in FIG. 3.) Accordingly, the AND gate 161 produces a HIGH output signal only when each of the comparators 154, 156, and 158 generates a HIGH output signal, i.e., only when the video signals are in a near-balanced condition. The output signal from the AND gate 161 is supplied to the lower input of each of the AND gates 163, 165, and 167. (For the sake of clarity in the drawing, however, the connections between the gates 161, 163, 165, and 167 are not depicted in FIG. 3.) Consequently, the $\overline{\text{HI}}$, $\overline{\text{MID}}$, and $\overline{\text{LO}}$ signals from the comparators 148, 150, and 152, respectively, cause samples to be taken by the storage matrix 80 only when the video signals are in a near-balanced condition. This is done in order to prevent an indication of an error when color in the picture actually is desired.

The tolerance level, or the range within which each signal can vary so as to produce an output from the comparator, is set by a potentiometer network 176 which is connected between one of the comparator input leads for each of the three comparators 154, 156 and 158. The outer input lead for the comparator is connected to the luminance input line 140. The voltage drop across the network 176 thus defines the tolerance.

CONTROL KNOB SCANNING AND ZEROING

Before proceeding with the description of the automatic balancing circuit, it will be explained how the settings of the control knobs in the control panels are communicated to the computer and the remainder of the system.

Figure 4:
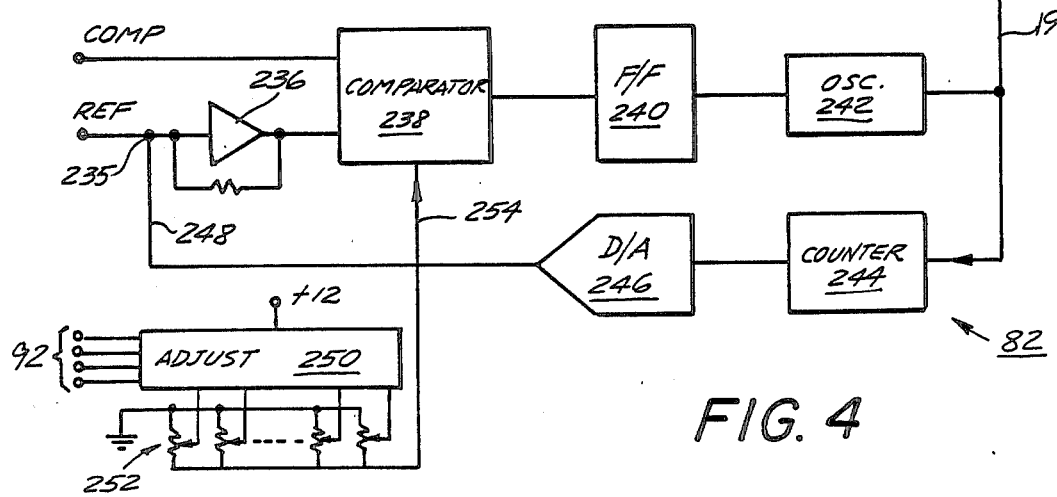
FIG. 4 is a schematic circuit diagram of another portion of the color correction system of the invention.

Referring now to FIG. 4, one of the control knobs is indicated at 262. The control knob 262 is one of the nine control knobs in the group 40 of color balance controls shown in FIG. 1. It is coupled directly to a shaft-position encoder 264 which converts the position of the knob into a digital signal. That digital signal is delivered to a counter 260, whose count is delivered to the computer over line 38, and to other parts of the system where needed.

The output of each counter 260 for each of the control knobs is scanned rapidly and repetitively by a multiplexing circuit (not shown) for a time period of approximately seven microseconds. The storage matrix 80 shown in FIG. 3 is provided in order to store sample voltages during a sampling interval, and then later deliver appropriate correction signals to each of the counters 260 during a readout cycle.

Although these functions could be provided by a properly programmed general purpose digital computer, in the mode of the invention described herein, the sampling and storage is analog and is later converted into digital form for use in the color correction process.

Each knob preferably is electrically returned to zero after each scene in a scene-by-scene color corrector by resetting the appropriate counter 260.

STORAGE MATRIX

The timing logic circuit 78 shown in FIG. 1 contains the circuitry necessary for performing the timing functions to be described below, and to scan the various control potentiometers as described above. The details of such logic are not disclosed herein because they would be readily evident to one skilled in the art and are not necessary to a description of the invention. However, certain switches forming a part of the logic circuit 78 are shown in FIG. 3 beneath the numeral 78. These switches bear reference numerals 178, 180 and 182. They are FET switches, as are all of the switches shown in the matrix circuit 80.

Each of the switches 178, 180 and 182 operates to switch the matrix circuit between two modes; an output mode and an input mode. The switches are shown in the output mode condition. The duration of the input mode is the time necessary for displaying one complete field, and the switches switch the matrix to the output mode during the vertical interval.

During the input mode, the switch 178 conducts output signals from the white comparator 148 to the gate leads of four FET storage switches 202, 212, 220 and 230, arranged in a vertical "GAIN" column in FIG. 3. Connected to one of the source and drain terminals of each switch is a capacitor 208, 210, 218 and 228 which is connected to ground. The other lead is connected to a data line 205, 207, 209 or 211. Each of the storage switches 202, etc., together with its capacitor, comprises an integrating sample-and-hold circuit. The capacitor is charged through the "on" resistance of the FET switch, and thus integrates the signals it receives and stores their average value.

Connected in series with the data line 205 are the source and drain path of another FET switch 184 which, when closed, applies the red video signal R to line 205. Connected in line 205 at a point beyond the connections of switches 202, 204 and 206 is another FET switch 186.

The switch 184 is closed only when a "near-red" signal is applied to the gate lead of the switch to turn it on. The "gain" switches 202, 212, 220 and 230 are turned on only while an output signal appears at the output of comparator 148. Thus, during the time when both a near-red and a $\overline{HI}$ signal are received, a signal is stored by the switch 202 and its capacitor. Similarly, while both of the near-blue and $\overline{MID}$ signals are received, other signals are stored by switch 214 and its capacitor. Also, when both a near-green and a $\overline{LO}$ signal are received, a signal is stored by switch 226 and its capacitor.

When the vertical interval arrives, the switches 178, 180 and 182 change state and assume the position shown in FIG. 3. During this period of time, the switch 184 is turned off, and the switch 186, previously open, now is turned on and closed by a signal called "R Scan" which is developed by the timing logic circuit 78. The "GAIN" notation on the lower contact of switch 178 indicates only that a sampling signal is applied to the terminal during a period in which gain sampling signals are supplied. The notations "GAM" and "PED" on the contacts of switches 180 and 182 similarly indicate the separate application of sampling signals during gamma and pedestal sampling, respectively, so that the three sampling modes operate in sequence and not simultaneously.

During the GAIN sampling mode, the switches 202, 212, 220, and 230 again are closed. Concentrating first on the switch 202, since the switch 186 is closed and the switch 184 is open, the signal stored on the capacitor connected to switch 202 will be delivered through the switch 186 through output amplifier 200 to a terminal marked "COMP". Since the switch 186 is closed while switches 190 and 194 remain open, because of sequential scanning signals applied to those switches, one and only one output signal is supplied at a given time to the amplifier 200 from the matrix 80 during the readout phase.

The operation of the sections for receiving the blue and green signals is similar to that described above for the red signals. During storage, the switch 180 allows the second vertical column of FET switches 204, 214, 224 and 232 to be turned on. Similarly, the output of the black comparator turns on a third vertical column of FET switches 206, 216, 226 and 234.

During readout, during the "B scan" interval, switch 190 is closed, and 188 is open, so that GAIN, GAMMA and PEDESTAL signals which have been stored for the blue channel are read out and delivered to the output circuit in sequence.

The operation of the switch 192 and the switch 194 to similarly store and then read out the GAIN, GAMMA and PEDESTAL for green is similar and will not be described in detail here.

During the storage mode, the luminance signal is delivered through a FET switch 196 to each of the switches 230, 323, and 234 for storage. At this time, the "Y select" gate signal at an output FET 198 is such as to keep that switch open. The complement of the "Y select" signal is used to control the FET switch 196. Thus, the FET switch 196 is closed when the FET switch 198 is open, i.e., in the storage mode. Correspondingly, the FET switch 198 is closed when the FET switch 196 is open, i.e., in the readout mode. The "Y select" signal is supplied to the storage matrix 80 by the timing logic 78, as shown in the lower right portion of FIG. 1.

When the readout mode is reached, the Y select signals applied to switche 196 and 198 reverse with respect to one another, and the stored luminance signals are delivered sequentially to the "REF" output terminal.

The circuit shown in the lower portion of FIG. 4 is referred to as "successive-approximation analog-to-digital converter".

The "COMP" and "REF" signals are applied to the terminals so marked at the left hand portion of the drawing. The "COMP" signal is delivered to one input terminal of a comparator circuit 238. The reference signal is delivered to a summing node 235 where it is added to a feedback signal on line 248. The sum of those signals is delivered through an operational amplifier 236 to the second input of the comparator circuit 238.

The comparator detects any difference between the "COMP" input signal and the reference signal, and produces an output signal which causes a flip flop circuit 240 to change its state and start an oscillator 242 running. The output of the oscillator circuit forms the signal on line 193 (see FIG. 1 as well as FIG. 4) which is delivered to the circuitry shown in the upper portion of FIG. 4 for sequentially driving the counters 260 connected with each control potentiometer to perform the desired color correction.

The signal on line 193 also is delivered to a digital counter 244 whose output is delivered to a digital-to-analog converter 246 whose output is delivered on line 248 to the summing node 235. As the total count produced by the oscillator 242 increases, the analog signal on line 248 increases until the two signals delivered to the input of the comparator circuit 238 match, and the oscillator turns off.

The signals on line 193 are delivered to a multiplexing circuit 254 which is used to deliver signals over one line 258 of nine output lines 256 to the counter 260 of each of the red, green and blue gain, gamma and pedestal potentiometers in the color balance bank 40 in FIG. 1. The 8 lines which are shown not connected to anything in FIG. 4 are connected to counters similar to the one shown in FIG. 4 for each of the other 8 color balance knobs. A sequencing signal supplied on line 266 by the control logic circuit enables each of the output lines 256 and 258 in proper sequence and at the proper time to deliver the signal to the right control knob circuit.

An adjustment circuit 250 is provided with a bank of nine potentiometers 252. The output of the potentiometers 252 is connected by a line 254 to the comparator to set a bias for the comparator which will have the effect of increasing or decreasing the correction signal. Each of the nine potentiometers 252 is provided in order to adjust one of the nine color balance potentiometers.

Signals on line 92 enable each of the potentiometers in sequence, in the same sequence that the multiplexer 252 is operated. The circuit 250 is a readily available integrated switching network which sequentially connects each of the potentiometers 252 to a voltage supply.

LIGHT-PEN EMBODIMENT

FIG. 8 shows schematically what is commonly known as a "light pen" 268. This is a well-known, pencil-shaped object the tip of which can be placed against the screen 94 of the monitor 28 to sample the signals within a small area under the tip of the pen. Such a pen can be used, in an alternative embodiment of the invention, to sample the signals in a very small area of the screen. The light pen is used instead of the window 98.

Other known alternatives to the use of a variable window include such devices as a "touch-screen", in which an embedded wire grid or a light beam or ultrasonic beam grid is used in connection with the screen so that when one touches his finger to a specific location on the screen, the location will be detected, and this detection can be used in the same manner described above for the light pen or a small window.

Other means may be used, if desired, to produce the effect produced by the window of the present invention; that is, to provide for the sampling of only a limited area of the video picture.

OPERATION

The operation of the invention now will be described without describing the functions of each of the pushbuttons in the panel 14. Those functions are described in detail in the "Luminance" and "Rainbow" patents identified above, and that description need not be repeated here.

When a motion picture film or video tape is to be corrected, a preferred first step in operating the system is to set reference values for the color corrections. Thus, the "set reference" button on the lower panel 14 is pressed, a piece of test film is run in the projector 16 or telecine, or a standard gray scale is used and the various control knobs are adjusted until a pleasing picture is obtained. Then, the values set by the knobs are entered in memory by pressing the "confirm" button, and the machine is ready to correct film. Alternatively, in accordance with the present invention, if the test picture is not too far out of balance, and "ABC" button can be pressed to create an automatic color balance. If this is not entirely satisfactory, manual adjustment of the color balance knobs can be used to make the balance exactly to the liking of the operator. Then the other knobs are operated, and the color corrections, both those made automatically and those made manually, are stored in the memory of the computer 30. In any event, the use of the ABC circuit usually will greatly speed the balancing procedure.

It should be understood that the step of setting references usually is done only once each day of operation, and is preferred, but not essential.

The film to be corrected is placed in the projector 16 or film scanner. Then the film is positioned so that the first frame is displayed, or some other frame desired for use as a starting frame is displayed. The "load count" and "confirm" buttons are pushed to reset the frame counter to zero. Then the film is run until a scene needing correction is displayed. The projector is stopped, and the "notch" switch is pressed to identify the frame with an "event number", which then is stored in memory. The color corrections which are applied to the picture displayed on the monitor screen are the reference corrections set in the first step of operation. If any of the corrections is not satisfactory, then new adjustments to the old corrections, or totally new color corrections can be made.

In either event, if any adjustments are necessary, the present invention can be used to great advantage. The automatic corrections, like the manual corrections, can be re-used with or without modifications. Since the achievement of a color balance in a new scene often is a time consuming procedure, use of the automatic color balance circuit will greatly speed the correction procedure.

The use of the window described above allows the operator to sample only specified portions of the picture so as to avoid many of the problems experienced with prior automatic balancing circuits. By excluding large pastel areas, for example, a major source of trouble is eliminated.

When the color correction process has been completed, the color corrections, both automatic and manual, are stored in memory by pressing the "mix" button. Depressing the "mix" button automatically transfers the new correction values to the color correction device so that the monitor displays a picture using the adjusted values.

This procedure then can be repeated for each other scene or frame needing color correction, so that the event numbers and corrections are stored in memory for every scene or frame to be corrected.

When it is desired to produce a color-corrected video tape copy, the image medium is rewound, the video tape recorder 20 is turned on, and either the "run mode" or the "load mode" is selected. In either case, corrected color component values previously stored are read out of memory under the control of the frame counter in the computer so as to deliver color-corrected signals to the video tape recorder to produce a fully color-corrected video tape 22.

Accordingly, the system shown in FIG. 1 can be used to quickly and efficiently color correct motion picture film or video signals from other telecines or sources such as video tape recorders, and produce a color-corrected video tape.

It should be understood that the term "color correction" herein includes the creation of additional new color combinations some of which might not have been achieved before.

COLOR MATCHING

SCENE-CHANGE ANALYSIS AND DETECTION

The methods of operation described above constitute scene-by-scene or frame-by-frame color correction in which the picture remains stationary while color correction is in process. In accordance with another aspect of the present invention, in certain applications it may be possible to further speed the color correction process by the provision of an automatic scene-change detector, of which several are known. The color corrections developed by the automatic circuit are stored, as well as the event number created by the automatic scene-change detector so that, on a second run through, the stored corrections would be utilized automatically to produce the color corrected video tape, all without stopping the film or tape during the color correction process. By pre-setting the window to an area of the film where it is not expected that troublesome portions of the picture such as blue sky and pastel walls might occur, in many instances the problems plaguing prior automatic color corrections circuits can be avoided so that satisfactory color correction can be achieved in a very short time.

One type of scene-change detector is shown in FIG. 1. A threshold detector circuit 272 is connected to the output of the storage matrix 80. When the error signals output from the matrix 80 exceed the pre-set threshold value, a scene-change signal is delivered to the timing logic circuit 78 and then to the computer 30 over line 274. Such a detection event is stored as a new event number, and the color corrections may be determined automatically and stored. These color corrections are used for the entire scene, that is, until the next event is detected automatically as described above. Alternatively, the running of the film or other medium can be stopped by the detection signal to allow manual correction.

Figure 9:
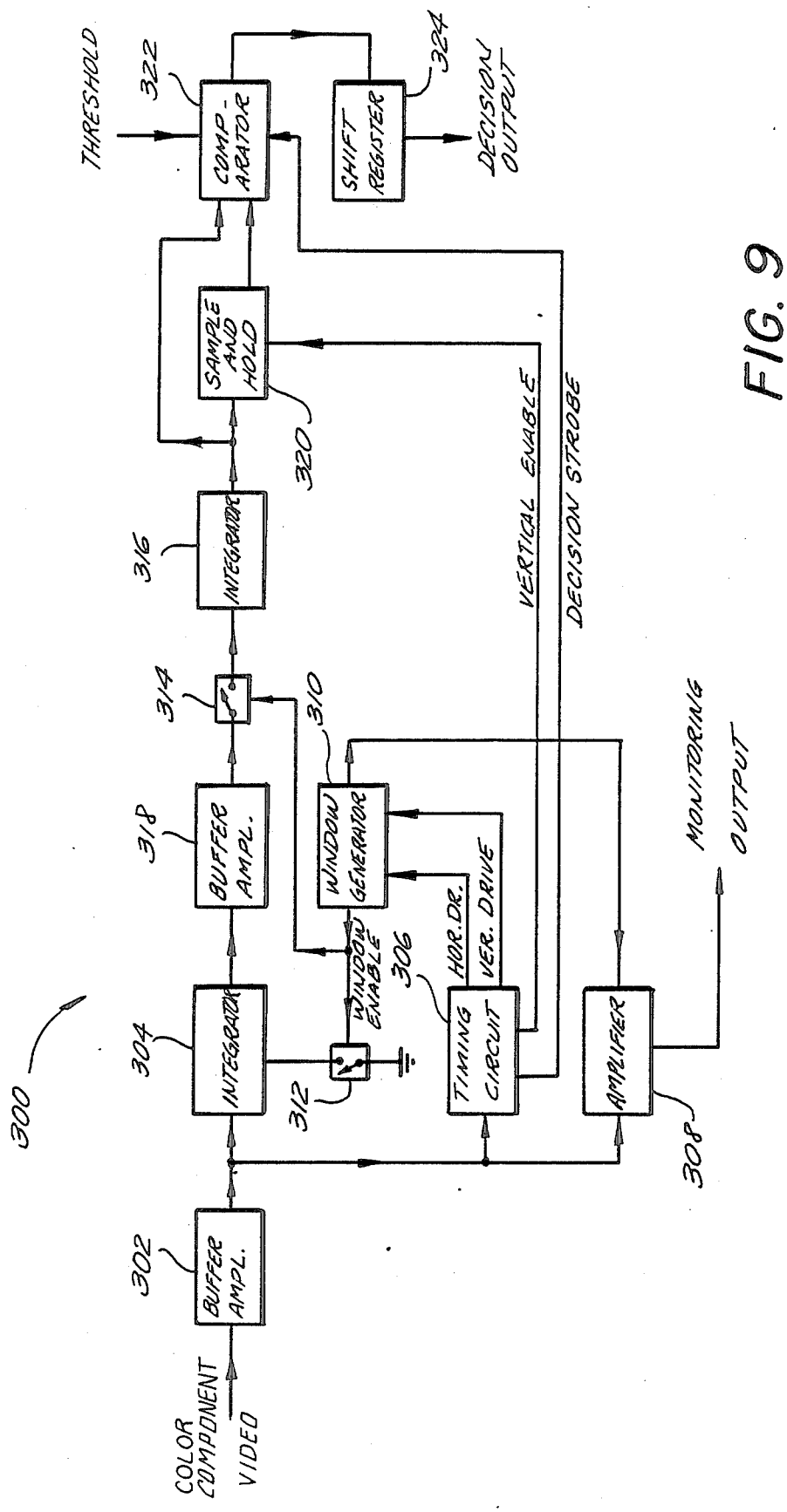
FIG. 9 is a schematic circuit diagram of a scene-change analyzer according to the present invention.

A scene-change analyzer is shown in FIG. 9 and designated by the reference numeral 300. The scene-change analyzer 300 operates on composite video signals from the film chain 18, shown in FIG. 1. The composite video signals introduced into the detector at the input of a buffer amplifier 302. The output signals from the buffer amplifier 302 are supplied to an integrator 304, a timing circuit 306, and an amplifier 308. The timing circuit 306 derives timing signals from the sync component of the incoming composite video signal. As is explained in greater detail below, these timing signals are used to synchronize the operation of the scene-change analyzer 300 to the incoming composite video signal.

The timing circuit 306 produces four timing signals: horizontal drive signals, vertical drive signals, vertical enable signals, and decision strobe signals. The horizontal and vertical drive signals produced by the timing circuit 306 are the same as the horizontal and vertical drive signals mentioned above during the discussion of the window controls. The horizontal and vertical drive signals produced by the timing circuit 306 are supplied to a window generator 310. The window generator 310 is essentially the same as the window generator illustrated in FIG. 5. The window generator 310 includes four programmable counters that are used to control the size and position of the window. However, the window generator 310 produces a window outline signal rather than a signal that causes video signals outside the window to be attenuated. The window outline signal is combined with the output signal from the buffer amplifier 302 in an amplifier 308. The output signal from the amplifier 308 is conducted to a monitor, such as the monitor 28 shown in FIG. 1. Accordingly, the monitor displays the video pictures with an outline, such as a bright line, for instance, around the window area.

The window generator 310 produces a window enable signal during the window portion of a field. The window enable signal is sent to FET switches 312 and 314, which close when they receive the window enable signal. When the switches 312 and 314 are closed, the integrator 304 and an integrator 316 are connected so that they may integrate. Because of their functions in the scene-change analyzer 300, the integrators 304 and 316 are referred to as the horizontal integrator and the vertical integrator, respectively. The horizontal integrator 304 has a time constant that enables it to integrate the composite video signal over a horizontal period; the vertical integrator 316 has a time constant that enables it to integrate the composite video signal over many horizontal periods. Therefore, the horizontal integrator produces an output signal that represents the average of the video signals in the window portion of a horizontal period. Each output signal from the horizontal integrator 304 is sent through a buffer amplifier 318 and through the switch 314 to the vertical integrator 316. Accordingly, the vertical integrator 316 produces an output signal that represents the average of the video signals in the window portion of a field.

The output signal from the vertical integrator 316 is provided to a sample-and-hold circuit 320 and a comparator 322. Timing signals from the timing circuit 306 are also provided to these circuits: The vertical enable signal is sent to the sample-and-hold circuit 320, and the decision strobe signal is sent to the comparator 322. The functions of these signals are described below during the description of FIGS. 10 and 11. The output signal from the sample-and-hold circuit 320 represents the average of the video signals in the window portion of the previous field, while the output signal from the vertical integrator 316 represents the average of the video signals in the window portion of the present field. Both of these signals are input to the comparator 322. A threshold signal is supplied to the comparator 322.

The comparator 322 compares the previous average window signal with the present average window signal to determine whether the absolute value of the difference between these signals is greater than the threshold level. That is, the comparator 322 will produce a 1 or HIGH output if either the present average window signal minus the previous average window signal or the previous average window signal minus the present average window signal is greater than the threshold level. A change in the average picture level in the window indicates a scene change. The output signal from the comparator 322 is furnished to a shift register 324.

The shift register 324 is used to provide a known delay since a one-field delay occurs when the previous and the present average window signals are compared. The shift register 324 receives clock signals from that same source that provides count signals for the color corrector. Specifically, the shift register is clocked by frame pulses when a motion picture projector is the source of video signals or by frame or field pulses when a video tape player is the source of video signals. As noted above, the input to the shift register 324 is a 1 or HIGH when the change in the average picture level in the window is greater than a threshold level, thereby denoting a scene change. This signal is shifted through the shift register 324 and then output as the decision output signal after a predetermined number of clock signals (or shifts), which corresponds to a predetermined number of counts.

The decision output signal is sent to the color corrector, which is programmed to subtract the predetermined number of counts from the present count in order to determine the location of the first field or frame of the new scene. Once the location of the first field or frame of the new scene has been determined, it may then be stored. For example, the shift register 324 may be selected to provide a four-count delay. The shift register 324, therefore, provides a 1 as the decision output signal four counts after it receives a 1 at its input. The color corrector is appropriately programmed to subtract four from the present count upon receiving such a decision output signal in order to determine the location of the beginning of the new scene.

The decision output signal may cause the motion picture film or video tape to be stopped so that the operator can enter color corrections. Moreover, the decision output signal may trigger an automatic color correction circuit so that operator action is unnecessary. In either case, the scene-change analyzer allows color corrections to be accomplished in less time and with less expense inasmuch as the scene-change analyzer eliminates the need for the operator to manually identify and locate the beginning of a new scene. For example, the film or tape transport mechanism may be run at twice its normal speed and stopped automatically when the scene-change analyzer indicates that a scene change has occurred. The operator may then enter color corrections that are valid from the beginning of the new scene.

FIGS. 10 and 11 illustrate the timing of the vertical enable signals and the decision strobe signals with respect to the vertical drive signals. FIG. 10 depicts three vertical drive signals 326, 328, and 330, which are shown as positive pulses in this instance. FIG. 11 depicts three vertical enable signals 332, 334, and 336 and three decision strobe signals 338, 340, and 342. The dashed lines in FIGS. 10 and 11 denote the leading and trailing edges of the vertical drive signals. FIGS. 10 and 11 show that the vertical enable and decision strobe signals occur completely within the boundaries of the vertical drive signals and that the decision strobe signals occur before and do not overlap the vertical enable signals.

Referring to FIGS. 9 and 11, when the comparator 322 receives the pulse 340, it compares the average window picture level determined during the period between the pulses 340 and 332 with the average window picture level determined during the period immediately preceding the pulse 338. Then, when the sample-and-hold circuit 320 receives the pulse 334, it samples the average window picture level determined during the period between the pulses 340 and 332. Next, when the comparator 322 receives the pulse 342, it compares the average window picture level determined during the period between the pulses 342 and 334 which is the output signal of the vertical integrator 316, with the average window picture level determined during the period between the pulses 340 and 332, which is the output signal of the sample-and-hold circuit 320. This process continues as long as composite video signals are provided to the scene-change analyzer.

Figure 12:
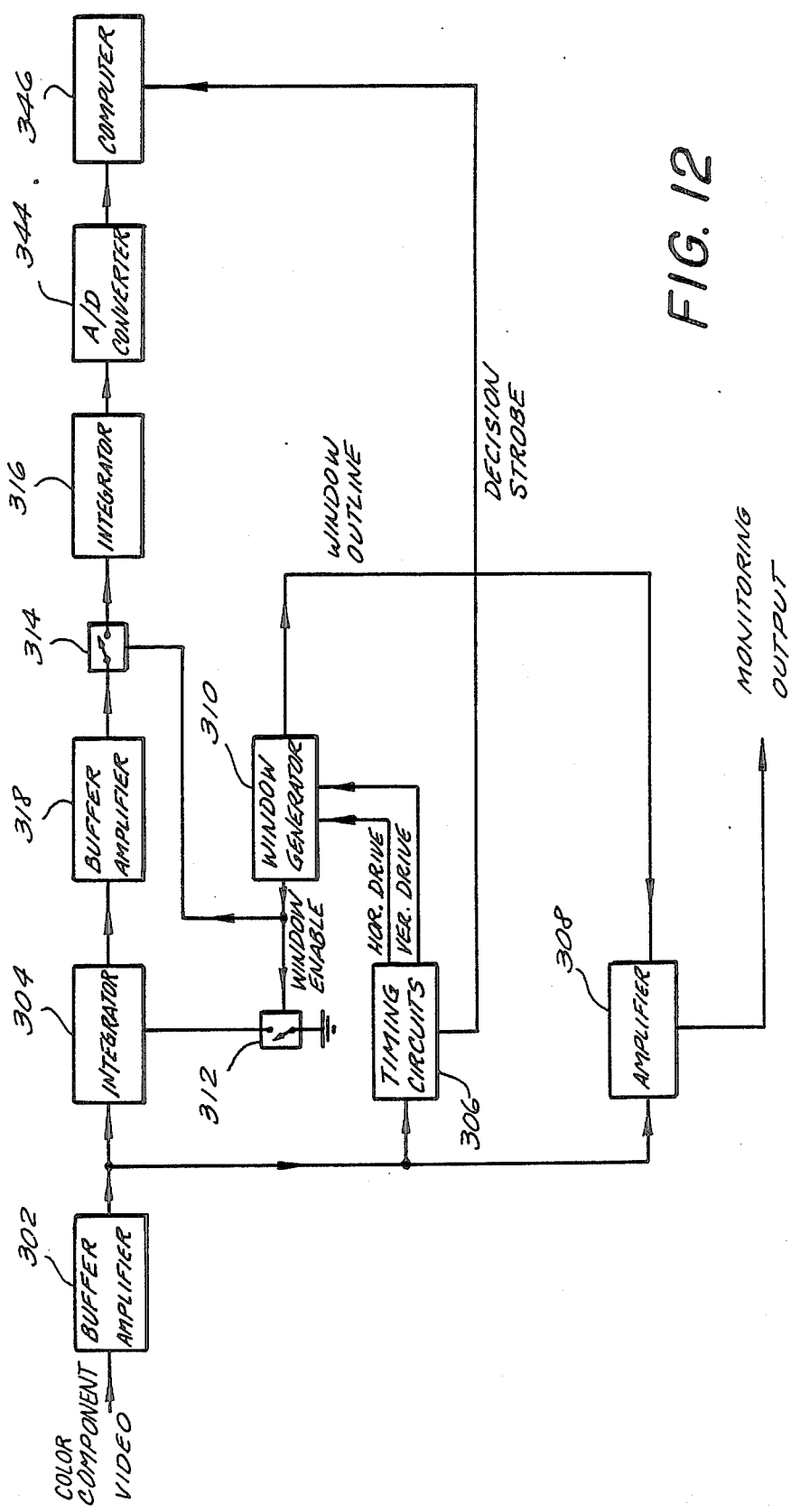
FIG. 12 is a schematic circuit diagram of another scene-change analyzer according to the present invention.

FIG. 12 depicts another scene-change analyzer. The scene-change analyzer shown in FIG. 12 is similar to the scene-change analyzer shown in FIG. 9 except that the sample-and-hold circuit 320, the comparator 322, and the shift register 324 have been replaced by an analog-to-digital converter 344 and a computer 346 at the output of the vertical integrator 316. The computer 346 may be programmed to perform the functions of the devices 320, 322, and 324. Furthermore, the computer 346 may be programmed to perform additional or alternative functions. For example, the computer 346 may be programmed to process a series of average window picture level signals in order to determine what type of transition, e.g., abrupt or gradual, has occurred. In addition, the computer 346 may be programmed to determine the length of a gradual transition and whether the gradual transition is linear or nonlinear. The average window picture level signals may be processed by the computer 346 and compared to a preprogrammed standard. But such signal processing may also be accomplished with a suitable arrangement of sample-and-hold circuits and comparators.

Although the foregoing discussion of the scene-change analyzer indicates that the scene-change analyzer is used with a window generator, the scene-change analyzer is not necessarily used with a window generator. A scene-change analyzer according to the present invention may determine the average of the video signals in an entire field. Furthermore, although the foregoing discussion notes that an average is taken of a portion of all of the composite video signal, the same principles may be employed to construct a scene-change analyzer that determines differences between average values in one or more of the three color channels red ("R"), green ("G") and blue ("B") and, if it is produced separately, in the luminance signal ("Y"). For example, a greater-than-threshold-level difference from one field to the next between the average window picture level for the red channel may denote a scene change. The same is true for the green and blue channels and the luminance signal. Consequently, a scene-change analyzer according to the present invention may include individual scene-change analyzers for one or more of the three color channels and the luminance signal, or it may include individual scene-change analyzers for one or more combinations of signals, such as R-Y and/or G-Y and/or B-Y.

A scene-change analyzer according to the present invention may be used with a color corrector in several ways. For instance, the color corrector may be programmed to stop the transport a specified number of frames after the scene-change signal, i.e., a specified number of frames after the scene boundary. The operator may then select suitable color correction values. The operator enters these values by pressing an appropriate button, which causes the color corrector to store these values and use them from the scene boundary just detected until the next scene boundary. The next scene boundary may be established manually by the operator or automatically by the scene-change analyzer. If the operator does not enter new color correction values after a new scene boundary is established, the color correction values for the scene preceding the new scene boundary will be used for the new scene when the next scene boundary (which indicates the end of the new scene and the beginning of the following scene) is established. In addition, the color corrector may be programmed to permit the transport to continue to operate after the scene-change analyzer generates a scene-change signal. The operator may then select suitable color correction values. These values are automatically stored by the color corrector and used for the entire scene when the color corrector receives the next scene-change signal. As indicated above, this is a so-called "on-the-fly" method for correcting color images. If the operator desires to use the color correction values from the preceding scene for the subsequent scene, the operator does not select new color correction values during the subsequent scene. When the scene-change signal indicating the end of the subsequent scene is received by the color corrector, it automatically applies the color correction values for the preceding scene to the subsequent scene.

OTHER VARIATIONS

The use of ninety consecutive sampling cycles as described above is not absolutely necessary. It is used in the preferred embodiment described above primarily because the settings of the specific potentiometer counters used can be changed only in certain relatively small increments. This, however, is easily changed, if desired, so that a full 1½ seconds would not be necessary for the sampling cycle, and automatic scene-by-scene color correction "on-the-fly" can be made feasible.

However, there is an advantage to sampling over a larger number of cycles and thus changing the color signals more gradually. This tends to prevent over-correction and "hunting" in the correction process which might occur if changes were made in relatively large increments or all at once.

Returning now to the operational method, it is possible that the automatic balancing circuit of the present invention will be useful in the direct broadcasting of films over the air. If, under the circumstances, the slight delay needed to operate the automatic circuitry is neither discernible nor objectionable, or can be compensated for by a video delay device, then the "window" may make the automatic correction circuitry viable for over the air direct broadcasts.

The above description of the invention is intended to be illustrative and not limiting. Various changes or modifications in the embodiments described may occur to those skilled in the art and these can be made without departing from the spirit or scope of the invention.

We claim:

1. A color correction system for color correcting video picture signals representative of images stored by an image recording medium, comprising:

means for moving the image recording medium and producing video picture signals representative of each of the images stored by the image recording medium;

display means responsive to said video picture signals for displaying pictures corresponding to each of the images stored by the image recording medium;

scene analysis means for analyzing at least one of the video picture signals in each of a plurality of pictures to detect a scene change, said scene analysis means automatically producing a scene-change signal in response to a scene change, said scene analysis means including means for determining a first average level of a video signal corresponding to a color component of the video picture signals in a portion of a first field, means for determining a second average level of said video signal in said portion of a second field, means for evaluating the difference between the first and second average levels based upon a predetermined standard, and means for automatically producing said scene-change signal if the predetermined standard is satisfied, said scene analysis means further including means for selectively changing the size and position of said portion of the first and second fields;

color correction means for selectively producing color correction signals for said video picture signals;

first storage means for selectively storing said color correction signals in response to a first manual command;

position signal means for producing position signals indicative of the position of each of the images stored by the image recording medium;

means for determining the location of an initial image of a new scene from the scene-change signal and from the position signals, said location determining means producing a location signal representative of the location of the initial image of the new scene;

second storage means for selectively storing said signal representative of the location of the initial image of the new scene in response to a second manual command;

readout means for reading from said first and second storage means said color correction signals and said location signals, respectively; and combining means for selectively combining color correction signals read from said first storage means with said video picture signals, said combining means being responsive to the location signals read from said second storage means and to the position signals from said position signal means.

2. A color correction system as in claim 1, wherein said first storage means and said second storage means store color correction signals and a location signal, respectively, in response to the same manual command.

3. A color correction system as in claim 1, wherein said transport means stops moving the image recording medium after a scene-change signal is produced by said scene analysis means.

4. A color correction system as in claim 1, wherein said color correction means includes means for automatically producing said color correction signals in response to a third manual command.

5. A method for color correcting video picture signals representative of images stored by an image recording medium, comprising the steps of:
  moving the image recording medium;
  producing video picture signals representative of each of the images stored by the image recording medium;
  displaying pictures corresponding to each of the images stored by the image recording medium;
  analyzing at least one of the video picture signals in each of a plurality of pictures to detect a scene change, said analyzing step including the steps of determining a first average level of a video signal corresponding to a color component of the video picture signals in a portion of a first field, determining a second average level of said video signal in said portion of a second field, evaluating the difference between the first and second average levels based upon the predetermined standard, said analyzing step further including the step of selectively changing the size and position of said portion of the first and second fields;
  automatically producing a scene-change signal if the predetermined standard is satisfied;
  selectively producing color correction signals for at least one of said video picture signals;
  selectively storing said color correction signals in response to a first manual command;
  producing position signals indicative of the position of each of the images stored by the image recording medium;
  determining the location of an initial image of a new scene from said scene-change signal and from said position signals;
  producing a location signal representative of the location of the initial image of the new scene;
  selectively storing said location signal in response to a second manual command;
  reading said color correction signals and said location signals; and
  selectively combining said color correction signals with said video picture signals in response to said location signals and said position signals.

6. A method as in claim 5, wherein the storing steps are accomplished in response to the same manual command.

7. A method as in claim 5, further comprising the step of stopping the image recording medium after a scene-change signal is produced.

8. A method as in claim 5, wherein the step of selectively producing color correction signals includes automatically producing said color correction signals in response to a third manual command.

* * * * *